United States Patent
Subramonian et al.

(10) Patent No.: US 9,350,493 B1
(45) Date of Patent: *May 24, 2016

(54) MULTI-PROTOCOL DATA TRANSFERS

(71) Applicant: AMERICAN MEGATRENDS, INC., Norcross, GA (US)

(72) Inventors: Shankar Subramonian, Norcross, GA (US); Srikumar Subramanian, Suwanee, GA (US); Anandh Mahalingam, Duluth, GA (US); Jomy Maliakal, Duluth, GA (US)

(73) Assignee: American Megatrends, Inc., Norcross, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/263,959

(22) Filed: Apr. 28, 2014

Related U.S. Application Data (63) Continuation of application No. 12/175,914, filed on Jul. 18, 2008, now Pat. No. 8,711,851.

(60) Provisional application No. 60/950,655, filed on Jul. 19, 2007.

(51) Int. Cl.
*G08C 25/02* (2006.01)
*H04L 1/18* (2006.01)
*H04L 1/08* (2006.01)

(52) U.S. Cl.
CPC .................................. *H04L 1/08* (2013.01)

(58) Field of Classification Search
CPC ......... G01R 31/08; G06F 11/00; G06F 11/14; G06F 12/08; H04L 12/24; H04L 12/28; H04L 12/54; H04L 12/56; H04L 12/66; H04L 29/06; H04L 1/1809; H04L 1/1812; H04L 1/1887; H04L 1/1819; H04L 1/188; H04L 1/08; H04Q 7/20
USPC .................. 370/389, 392, 473; 709/227, 238
See application file for complete search history.

(56) References Cited

U.S. PATENT DOCUMENTS

| | | | |
|---|---|---|---|
| 4,942,579 A | 7/1990 | Goodlander et al. | |
| 5,257,367 A | 10/1993 | Goodlander et al. | |
| 5,720,027 A | 2/1998 | Sarkozy et al. | |
| 5,732,238 A | 3/1998 | Sarkozy | |
| 5,790,774 A | 8/1998 | Sarkozy | |
| 5,893,919 A | 4/1999 | Sarkozy et al. | |
| 5,987,022 A * | 11/1999 | Geiger et al. | 370/349 |
| 6,098,128 A | 8/2000 | Velez-McCaskey et al. | |
| 6,115,393 A | 9/2000 | Engel et al. | |
| 6,401,117 B1 | 6/2002 | Narad et al. | |
| 6,608,841 B1 * | 8/2003 | Koodli | 370/474 |
| 6,684,306 B1 | 1/2004 | Nagasawa et al. | |
| 6,738,379 B1 | 5/2004 | Balazinski et al. | |

(Continued)

*Primary Examiner* — Esaw Abraham
*Assistant Examiner* — Enamul M Kabir
(74) *Attorney, Agent, or Firm* — Meunier Carlin & Curfman LLC (57) ABSTRACT

Technologies are described herein for performing a multi-protocol data transfer. A first protocol that guarantees reliability and in-order delivery of data packets is utilized to transmit control information for a data transfer. Once the control information has been transmitted and received at the destination, a second protocol is utilized to transfer the actual data. The second protocol does not guarantee data reliability or in-order delivery. If any data packets are not delivered to the destination using the second protocol, either the first protocol, the second protocol, or a combination can be utilized to retransmit the missing packets.

20 Claims, 6 Drawing Sheets

(56) References Cited

U.S. PATENT DOCUMENTS

| | | |
|---|---|---|
| 6,856,602 B1 | 2/2005 | Westberg |
| 7,328,049 B2 | 2/2008 | Chanut |
| 7,388,852 B2 | 6/2008 | Zhang et al. |
| 7,551,568 B2 | 6/2009 | Jeong et al. |
| 7,561,571 B1 | 7/2009 | Lovett et al. |
| 7,653,049 B2 * | 1/2010 | Kobayashi .......... H04M 1/2535 370/352 |
| 8,045,585 B2 | 10/2011 | Mohaban et al. |
| 8,160,107 B2 | 4/2012 | Miyazaki et al. |
| 8,228,948 B2 | 7/2012 | Russell |
| 8,248,939 B1 | 8/2012 | Craft et al. |
| 8,532,106 B2 | 9/2013 | Gandham et al. |
| 2007/0174429 A1 * | 7/2007 | Mazzaferri et al. ........... 709/218 |
| 2008/0076435 A1 * | 3/2008 | Chen et al. ................... 455/445 |
| 2008/0198787 A1 | 8/2008 | Nguyen |

\* cited by examiner

MULTI-PROTOCOL DATA TRANSFERS

CROSS-REFERENCE TO RELATED APPLICATIONS

This application is a continuation of U.S. patent application Ser. No. 12/175,914, filed Jul. 18, 2008, which issued as U.S. Pat. No. 8,711,851 on Apr. 29, 2015 entitled "MULTI-PROTOCOL DATA TRANSFERS," which also claims the benefit of provisional U.S. patent application No. 60/950,655, filed on Jul. 19, 2007, and entitled "EFFICIENT AND FAST LONG DISTANCE DATA TRANSFERS OVER THE INTERNET," which are expressly incorporated herein by reference in their entireties.

BACKGROUND

The Transmission Control Protocol/Internet Protocol ("TCP/IP") has been widely deployed for file and data transfers. While TCP/IP is a robust protocol for many types of data transfers, this protocol exhibits certain characteristics that result in major throughput degradation when transferring data over long distances. The TCP/IP protocol was originally devised for local area networks ("LANs") having negligible round trip time ("RTT") and packet loss. In these types of network scenarios, the network throughput attained by TCP/IP closely tracks the theoretical maximum throughput of the network transport layer.

When used over wide area networks ("WANs") covering long distances and having transports with varying transfer characteristics and delays, however, the rigid error recovery mechanisms of TCP throttle the overall throughput in an adverse manner. For long-haul networks with non-negligible RTT and packet loss, the overall throughput no longer depends on the transfer rates supported by the transport, but is a function of the RTT.

Because TCP/IP utilizes various mechanisms for congestion control, such as a sliding window, congestion avoidance, and slow-start, this protocol can become very bursty when the protocol encounters network delays and packet losses. In particular, the longer the latency, the more bandwidth-intensive TCP becomes while negotiating network congestion. This causes data transfers using the TCP/IP protocol over long distances, such as over inter-continental fiber optic links or geostationary satellites, to take considerably longer than necessary.

It is with respect to these considerations and others that the disclosure made herein is presented.

SUMMARY

Technologies are described herein for performing a multi-protocol data transfer. Through the utilization of the technologies and concepts presented herein, multiple data transmission protocols are utilized during a single data transfer to maximize the speed of the data transfer. The multi-protocol data transfer mechanism described herein provides significant speed improvements when utilized to transfer data over long distances.

According to one aspect presented herein, a first protocol that guarantees reliability and in-order delivery of data packets is utilized to transmit control information for a data transfer. Once the control information has been transmitted and received at the destination, a second protocol is utilized to transfer the actual data. The second protocol does not guarantee data reliability or in-order delivery. If any data packets are not delivered to the destination using the second protocol, the first protocol is utilized to transmit the missing packets. In this manner, the bandwidth available for data transfer is maximized and the negative performance impact of the correction mechanisms utilized by the first protocol is minimized.

According to other aspects, the first protocol is utilized to send control information for a data segment to be transferred from a source to a destination. The control information provides information regarding the data to be transferred. For instance, in one implementation the control information comprises a sequence table that includes a listing of the data packets to be transferred for the data segment. An acknowledgement may be received from the destination indicating that the control information was received.

Following receipt of the acknowledgement, the second protocol is utilized to transfer the data packets to the destination. As discussed above, the second protocol does not guarantee data reliability or in-order delivery of the packets. As a consequence, no bandwidth is wasted by transmitting error recovery data between the source and the destination. Once the data packets have been transmitted, the first protocol is utilized to transmit an indication to the destination that the transmission of the data packets has completed.

When an indication is received at the destination indicating that all of the packets have been transmitted, the control information is utilized to determine whether all of the data packets were received at the destination. If all of the data packets were not received, the first protocol is utilized to transmit control information to the source that identifies the data packets that were not received. The first protocol, the second protocol, or a combination thereof can then be utilized to transmit the missing data packets to the destination. This whole process may be repeated for multiple data segments in a data file until the entire file is transferred.

According to other aspects, the original control information used to begin the transfer, may be divided into portions where only the first portion is transmitted using the first protocol and the remaining portion, or portions, are transmitted using the second protocol just before the payload data is also transmitted using the second protocol. For larger control information blocks, such division may improve overall throughput.

According to other aspects, a mixture of the TCP protocol and the user datagram protocol ("UDP") is utilized for a data transfer, thereby providing the benefits of both. In particular, according to embodiments the first protocol comprises the TCP protocol and is primarily utilized for guaranteed error-free transmission of control information and a relatively small number of data packets. In embodiments, the second protocol comprises the UDP protocol. In such an implementation, the bulk of the data packets to be transmitted are transmitted using the UDP protocol. At the end of the transmission, the data received over UDP is analyzed to identify missing data packets. Any missing data packets are transmitted from the source to the destination using the TCP protocol.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore,

DETAILED DESCRIPTION

The following detailed description is directed to technologies for performing a multi-protocol data transfer. In particular, the embodiments presented herein provide a mechanism for transferring a data file between a source and a destination. As will be described in greater detail below, control information is initially sent from the source to the destination. In order to ensure guaranteed delivery of the control data, a protocol that ensures reliability and in-order delivery of data packets, like TCP, is utilized to transmit the control information. After this exchange of packets, the bulk of the file transfer utilizes a protocol that does not guarantee data reliability or in-order delivery, such as UDP.

Depending on network conditions, some of the transmitted data packets may not be delivered to the destination. In order to transmit the missing packets between the source and the destination, the destination transmits control information to the source that identifies the missing packets. This control information is also sent using a protocol that ensures reliability and in-order delivery of data packets. Once the source has received this information, the source transfers the missing packets to the destination also using a protocol that ensures reliability and in-order delivery of data packets. It should be appreciated that although the embodiments presented herein are described as utilizing TCP and UDP, other protocols having similar characteristics may be utilized.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
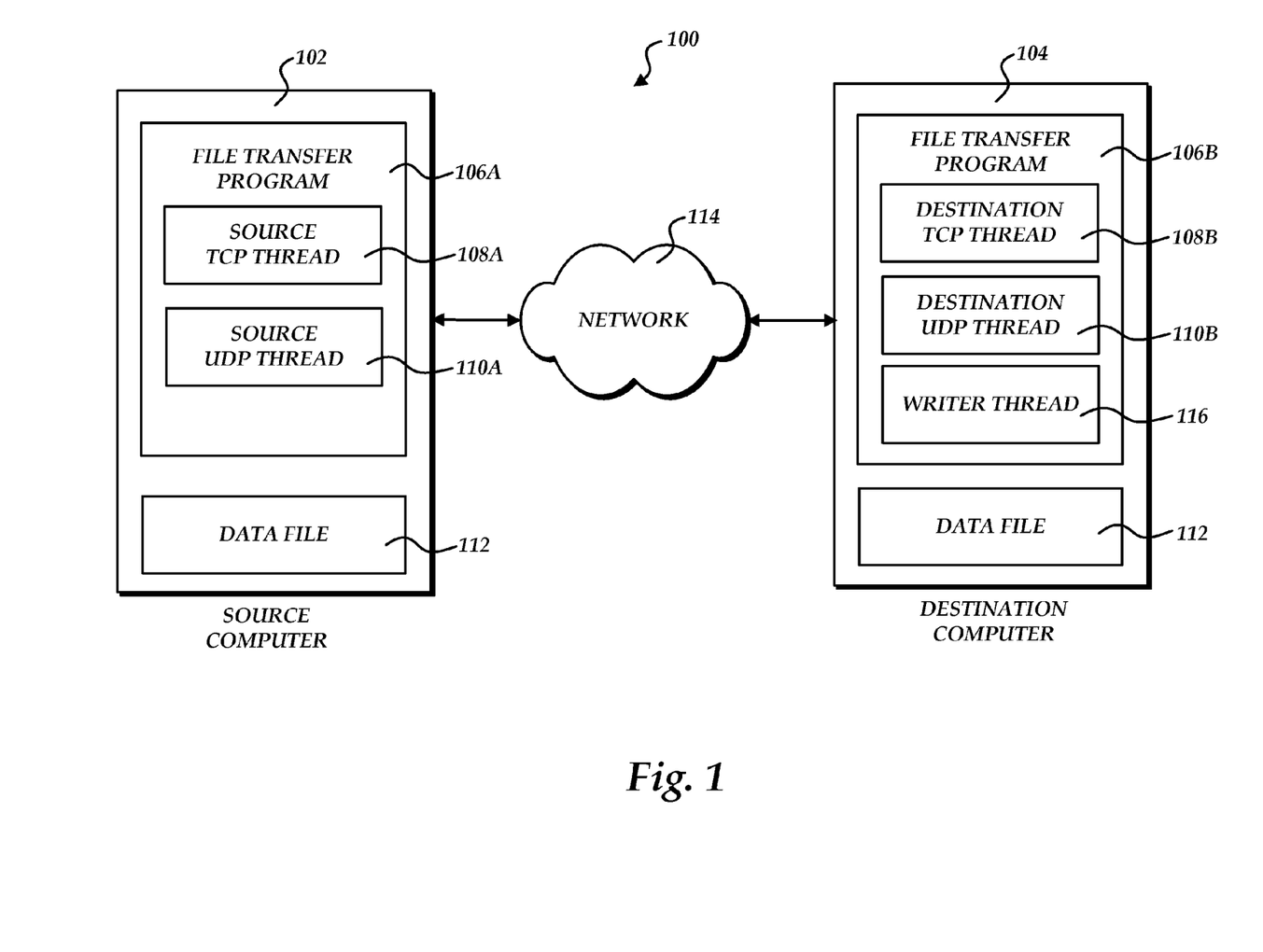
FIG. 1 is a network and software architecture diagram illustrating aspects of an operating environment for the embodiments presented herein along with aspects of several software components presented herein.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for performing a multi-protocol data transfer will be described. In particular, FIG. 1 is a network architecture diagram showing aspects of an operating environment for the embodiments presented herein along with aspects of several software components presented herein. As shown in FIG. 1, a source computer 102 is provided that is configured to transmit a data file 112 over a network 114 to a destination computer 104. In one embodiment, the network 114 comprises a long-haul network that utilizes long distance fiber optic or satellite links. It should be appreciated, however, that the network 114 might comprise any type of network.

The source computer 102 comprises a standard desktop, laptop, or server computer configured to transmit a data file 112 to a destination computer 104. The destination computer 104 comprises a standard desktop, laptop, or server computer configured to receive the data file 112 from the source computer 102 in the manner described herein. It should be appreciated that the embodiments presented herein may be implemented and utilized by other types of computing devices, including but not limited to, consumer electronics, hand-held computing systems, wireless telephones, and others. It should also be appreciated that although the embodiments presented herein are described in the context of transferring a data file 112 from the source computer 102 and the destination computer 104, other types of data transfers may be performed using the concepts presented herein. For instance, all or a portion of the data stored on a mass storage device maintained by the source computer 102 may be transmitted to the destination computer 104 on a block-by-block basis. It should be appreciated, therefore, that the embodiments presented herein are not limited to the transmission of data stored in data files.

In order to perform the data transfers described herein, the source computer 102 executes a file transfer program 106A and the destination computer 104 executes a file transfer program 106B. The file transfer program 106A and the file transfer program 106B operate in conjunction to transfer the data file 112 from the source computer 102 to the destination computer 104. In particular, the file transfer program 106A executes a source TCP thread 108A and a source UDP thread 110A. The file transfer program 106B executes a destination TCP thread 108B, a destination UDP thread 110B, and a writer thread 116. As used herein, the term "thread" refers to a thread of execution. As known in the art, a thread allows a computer program to split itself into two or more simultaneous running tasks. It should be appreciated that other mechanisms may also be utilized to implement the multi-protocol data transfer presented in the embodiments described herein.

As will be described in greater detail below, the source TCP thread 108A and the destination TCP thread 108B communicate with one another to transmit relatively small numbers of critical data packets between the source computer 102 and the destination computer 104. For instance, control information regarding missing packets, and the missing packets themselves, may be transmitted between the source TCP thread 108A and the destination TCP thread 108B. It should be appreciated that although TCP is utilized in the embodiments presented herein for transmitting these packets, any protocol that ensures reliability and in-order delivery of data packets may be utilized.

As will also be described in greater detail below, the source UDP thread 110A and the destination UDP thread 110B communicate with one another to transmit relatively large numbers of data packets. Because UDP does not provide reliability or in-order deliver of data packets, the data packets can be transmitted from the source computer 102 to the destination computer 104 using all of the bandwidth available on the network 114. As will also be described in greater detail below, because UDP does not provide in-order delivery of packets, a data structure is utilized to order the data packets. It should be appreciated that although UDP is utilized in the embodiments presented herein for transmitting these packets, other protocols that do not ensure reliability or in-order delivery of data packets may be utilized. The writer thread 116 is utilized to write the received data packets to a mass storage device. Additional details regarding its operation will be provided below.

Figure 2:
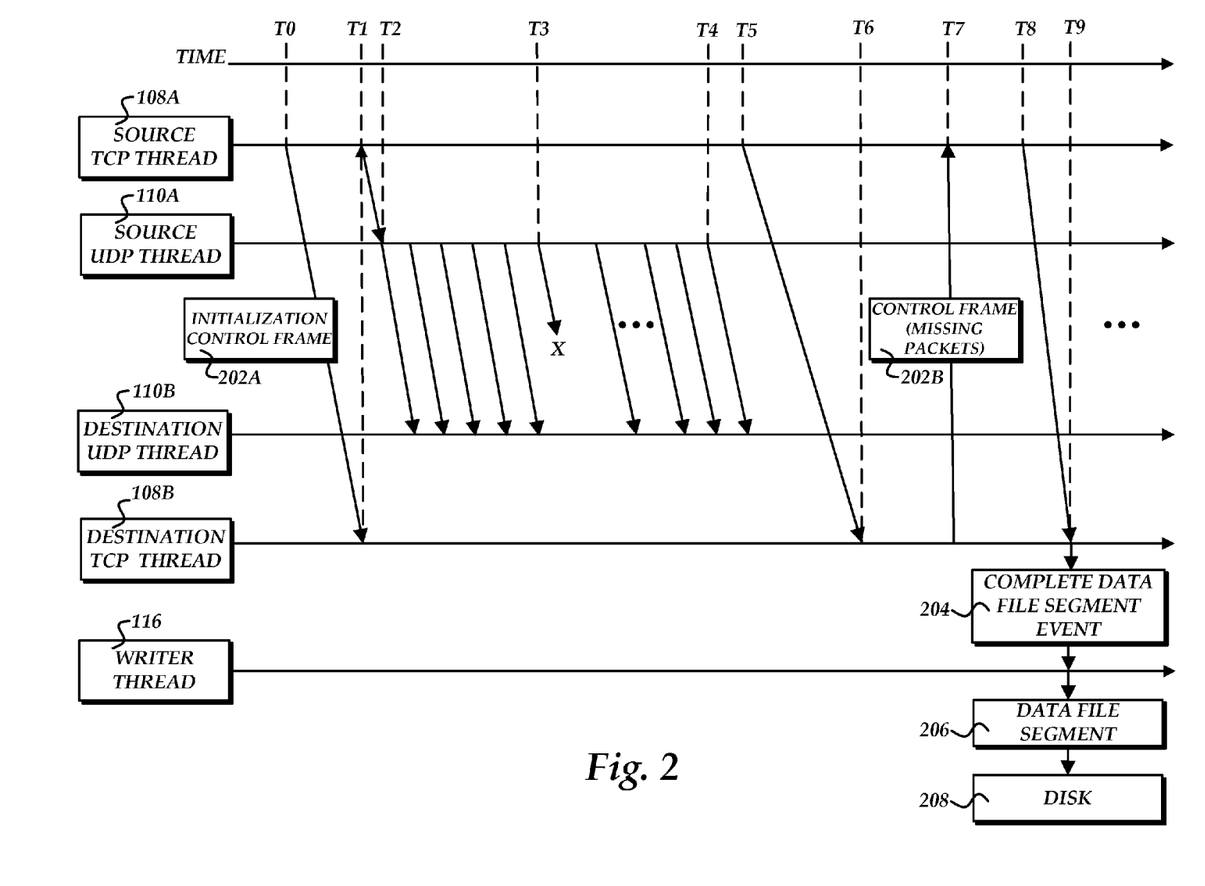
FIG. 2 is a timing diagram showing aspects of an illustrative file transfer using a multi-protocol file transfer provided in one embodiment presented herein.

Referring now to FIG. 2, a timing diagram showing aspects of an illustrative file transfer using a multi-protocol file transfer provided in one embodiment presented herein will be described. In particular, FIG. 2 illustrates the operation of the source TCP thread 108A, the source UDP thread 110A, the destination UDP thread 110B, the destination TCP thread 108B, and the writer thread 116 during the transmission of a segment of the data file 112. As shown in FIG. 2, the source TCP thread 108A uses the TCP protocol to transmit an initialization control frame 202A to the destination TCP thread 108B at time T0. The initialization control frame 202A includes control information that identifies the file name of the data file 112, the file size of the data file 112, and a sequence table that identifies the packets to be transmitted. Additional details regarding the contents and use of the initialization control frame will be provided below with respect to FIG. 4.

If the initialization control frame 202A is larger than a certain threshold of size, the initialization control frame 202A may be divided into a first, smaller portion and a remaining portion. The first portion of the initialization control frame 202A may be transmitted using the TCP thread 108B at time T0 while the remaining portion (or portions) of the initialization control frame 202A may be transmitted by the source UDP thread 110A at the beginning of the data transmission. The first portion of the initialization control frame 202A can be constructed to contain sufficient information to validate all of the information transferred using UDP. That is, all of the payload data as well as the rest of the initialization control frame 202A.

When the destination TCP thread 108B receives the initialization control frame 202A, it returns an acknowledgement to the source TCP thread 108A at time T1. In response to receiving the acknowledgement, the source TCP thread 108A instructs the source UDP thread 110A to begin transmitting packets. In response to receiving the instruction, the source UDP thread 110A begins transmitting packets to the destination UDP thread 110B at time T2. In one embodiment, all of the data packets for a segment of the data file 112 are transmitted sequentially until the segment has been completely transmitted. The destination UDP thread 110B places the received data packets into a buffer. UDP, being a fast datagram service, does not guarantee either the delivery or the order of packet reception. As a result, it is possible for packets to be lost during transmission, such as illustrated at time T3 in FIG. 2. Moreover, the transmitted data packets will not be received at the destination computer 104 in the order they were transmitted. A mechanism for re-ordering the packets at the destination will be described below with respect to FIG. 4.

Following the transmission of the last data packet in the data segment at time T4, the source TCP thread 108A transmits an indication to the destination TCP thread 108B that transmission of the segment has completed using the TCP protocol. The indication is transmitted by the source TCP thread 108A at time T5 and is received by the destination TCP thread 108B at time T6. The destination UDP thread 110B then identifies the data packets that were not received from the source UDP thread 110A. The destination TCP thread 108B then transmits a control frame 202B that includes data identifying the missing packets to the source TCP thread 108A. The control frame 202B is sent using the TCP protocol at time T7. The control frame 202B may identifying the missing packets by listing them explicitly, or by representing all transferred packets by a bitmap and only setting (or clearing) bits that represent missing packets. Furthermore, the "explicit list" technique and the "bitmap" technique may be combined where a bitmap is used unless the explicit list is smaller than the bitmap. If the explicit list is shorter in length than the bitmap, then the list itself can be transmitted. Any one or, or combination of these techniques for identifying the missing packets to resend can be used.

In response to receiving the control frame 202B, the source TCP thread 108A can transmit the missing packets to the destination TCP thread 108B using the TCP protocol at time T8. TCP is utilized to ensure that the missing packets will be received by the destination TCP thread 108B. Alternatively, the source UDP thread 110A can transmit the missing packets to the destination UDP thread 110B using UDP. This optional retry send using UDP may provide throughput benefits over using TCP for the resend phase. One or more UDP retries may be attempted before finally resending any remaining packets using TCP. The number of UDP retry cycles may be specified according to system parameters, or adaptively determined such that the UDP retries continue until the amount of remaining data to be resent falls below a threshold where switching to TCP incurs an acceptable overhead. Once the missing packets have been received, the destination TCP thread 108B triggers an event 204 to the writer thread 116. The event 204 indicates that a complete data file segment 206 has been received.

In response to receiving the event 204, the writer thread 116 writes the data file segment 206 to a disk 208 or other type of mass storage device maintained by the destination computer 104. It should be appreciated that, according to embodiments, the writer thread 116 sleeps until the event 204 is received from the destination TCP thread 108B. Moreover, according to implementations, the writer thread 116 uses large sized write calls wherever possible to reduce the number of disk input/output operations ("I/Os"). It should also be appreciated that, in embodiments, the disk I/Os are performed by the writer thread 116 concurrently as another file segment is being received into a different buffer than the one utilized to store the first file segment. The process illustrated in FIG. 2 is repeated for each of the data segments in the data file 112 until the entire data file 112 has been transmitted.

Figure 3:
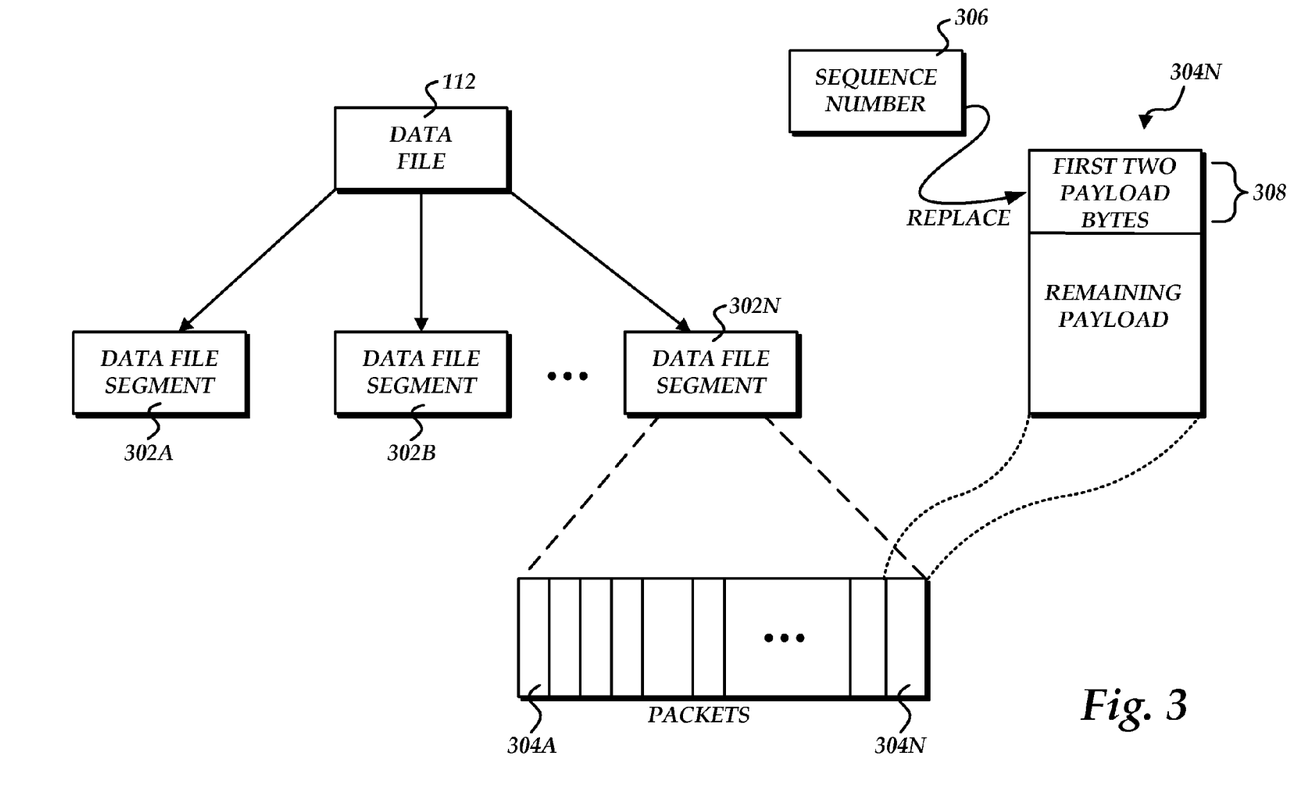
FIG. 3 is a data structure diagram illustrating the organization and contents of data packets utilized in an embodiment provided herein.

Referring now to FIG. 3 a data structure diagram will be described that illustrates the organization and contents of data packets utilized in an embodiment provided herein. As shown in FIG. 3, the data file 112 is divided into a number of data file segments 302A-302N for transmission from the source computer 102 to the destination computer 104. In turn, each data file segment 302A-302N is divided into a number of data packets 304A-304N (the data packets 304A-304N may also be referred to herein as "buffers" or "datagrams"). According to embodiments, the data packets 304A-304A-304N are approximately 1 kilobyte ("KB") in size. It should be appreciated, however, that other buffer sizes may be utilized. Larger buffer sizes have a marginal advantage on time and resource utilization, but suffer from the disadvantage of not making it to the destination in a lossy link even if only a small portion of the constituent data is dropped.

In order to allow the data packets 304A-304N to be correctly ordered at the destination computer 104, a unique sequence number 306 is placed within each of the data packets 304A-304N. A sequence number is a unique sequential number that is assigned to each packet. As will be described in greater detail below, the sequence numbers are utilized at the destination computer 104 to place the received data packets into their correct order. In one embodiment, the sequence number 306 occupies the first two bytes of each data packet. As will be described in greater detail below, the first two payload bytes 308 that were originally stored in the first two bytes of each data packet are stored in a sequence table and transmitted to the destination computer 104 in the initialization control frame 202A. The sequence number 306 is replaced with the original first two payload bytes 308 from each data packet prior to writing the packet to the disk 208 or other mass storage device.

Figure 4:
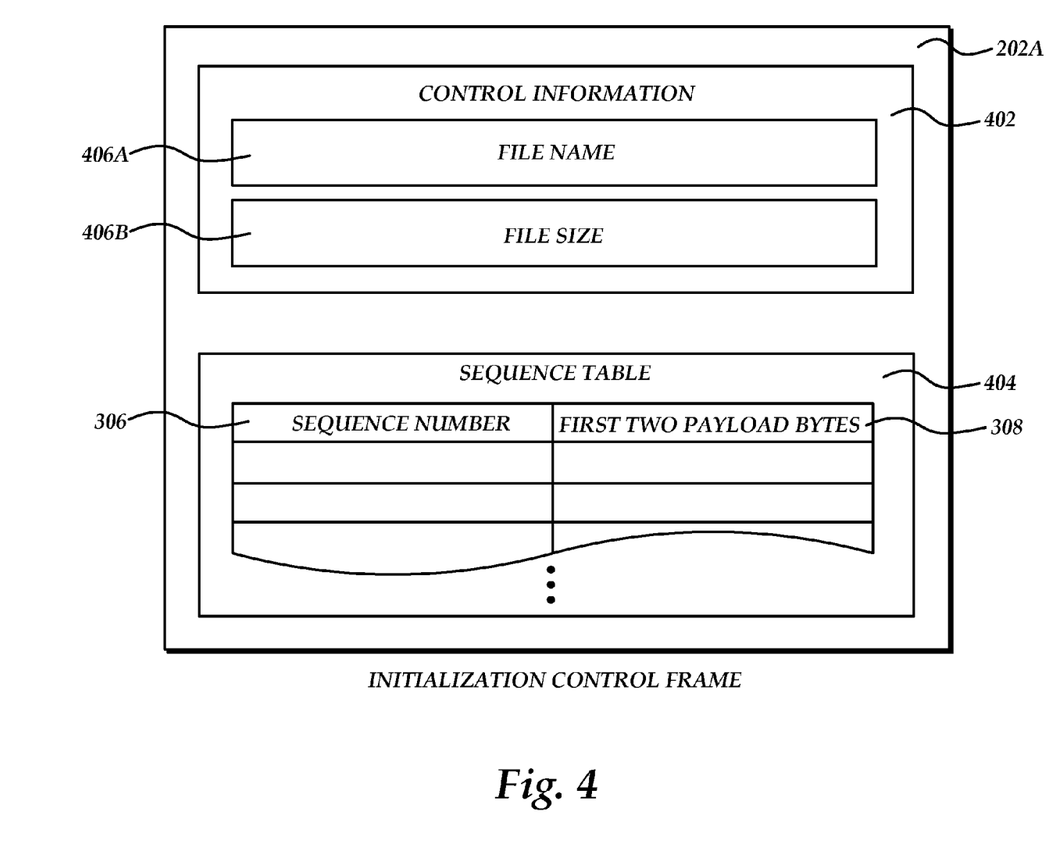
FIG. 4 is a data structure diagram illustrating the contents of an initialization control frame utilized in one embodiment presented herein.
Figure 5:
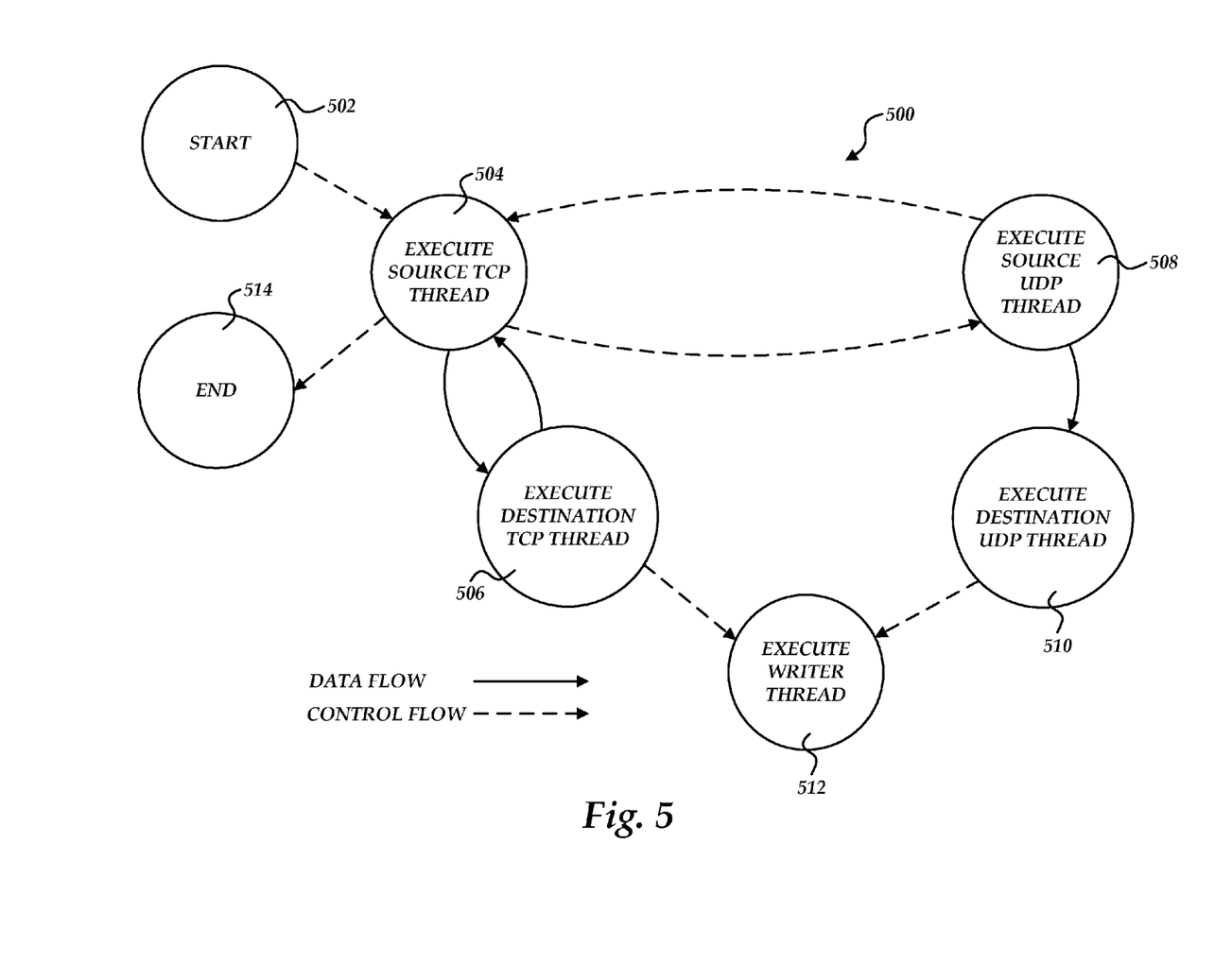
FIG. 5 is a state diagram illustrating the operation of several software components that operate in conjunction to perform a multi-protocol data transfer in one embodiment presented herein.

FIG. 4 illustrates the contents of the initialization control frame 202A in one embodiment. In particular, as shown in FIG. 5, the initialization control frame 202A may include control information 402 that identifies a file name 406A for the data file 112 along with data that indicates the file size 406B of the data file 112. Other data describing other characteristics of the data file 112 may also be included in the initialization control frame 202A.

The initialization control frame 202A also includes the sequence table 404. The sequence table 404 includes a column of data fields for storing the sequence numbers 306 assigned to each of the data packets to be transmitted for the data file 112. For each sequence number 306, a second column includes a field that holds the original first two payload bytes 308 that were removed from the first two bytes of the corresponding data packet. The sequence table 404 can be ordered and indexed by the sequence numbers 306. As discussed briefly above, once the received data packets have been placed in the correct order using the sequence numbers 306, the original first two payload bytes 308 from the second column of the sequence table 404 are returned to their proper location in the first two bytes of each data packet 304A-304N. In this manner, each data packet 304A-304N can be assigned a unique sequence number prior to transmission without changing the size of the data packet.

Turning now to FIG. 5, additional details will be provided regarding the embodiments presented herein for multi-protocol data transfer. In particular, FIG. 5 is a state diagram illustrating a state machine 500 that shows aspects of an illustrative process performed by the several software components that operate in conjunction to perform a multi-protocol data transfer in one embodiment presented herein. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The state machine 500 begins its operation at state 502. When a transfer is initiated, the state machine 500 transitions to state 504, where the source TCP thread 108A is executed. The source TCP thread 108A communicates with the destination TCP thread 108B, which is executed at state 506. As discussed above, the source TCP thread 108A and the destination TCP thread 108B exchange control information and a relatively small number data packets using the TCP protocol, such as the initialization control frame 202A.

Once the initialization control frame 202A has been transmitted to the destination computer 104, the source UDP thread 110A is executed at state 508. As discussed above, the source UDP thread 110A transmits the data packets to the destination UDP thread 110B, which is executed on the destination computer 104 at state 510. As also described above, any packets not received by the destination UDP thread 110B are transmitted from the source TCP thread 108A to the destination TCP thread 108B. Once all of the packets have been received at the destination, an event 204 is triggered that causes the writer thread 116 to be awakened at state 512. The writer thread 116 stores the received data file segment 206 on a disk 208 or other mass storage device. This process is then repeated for each of the data segments in the data file 112.

Figure 6:
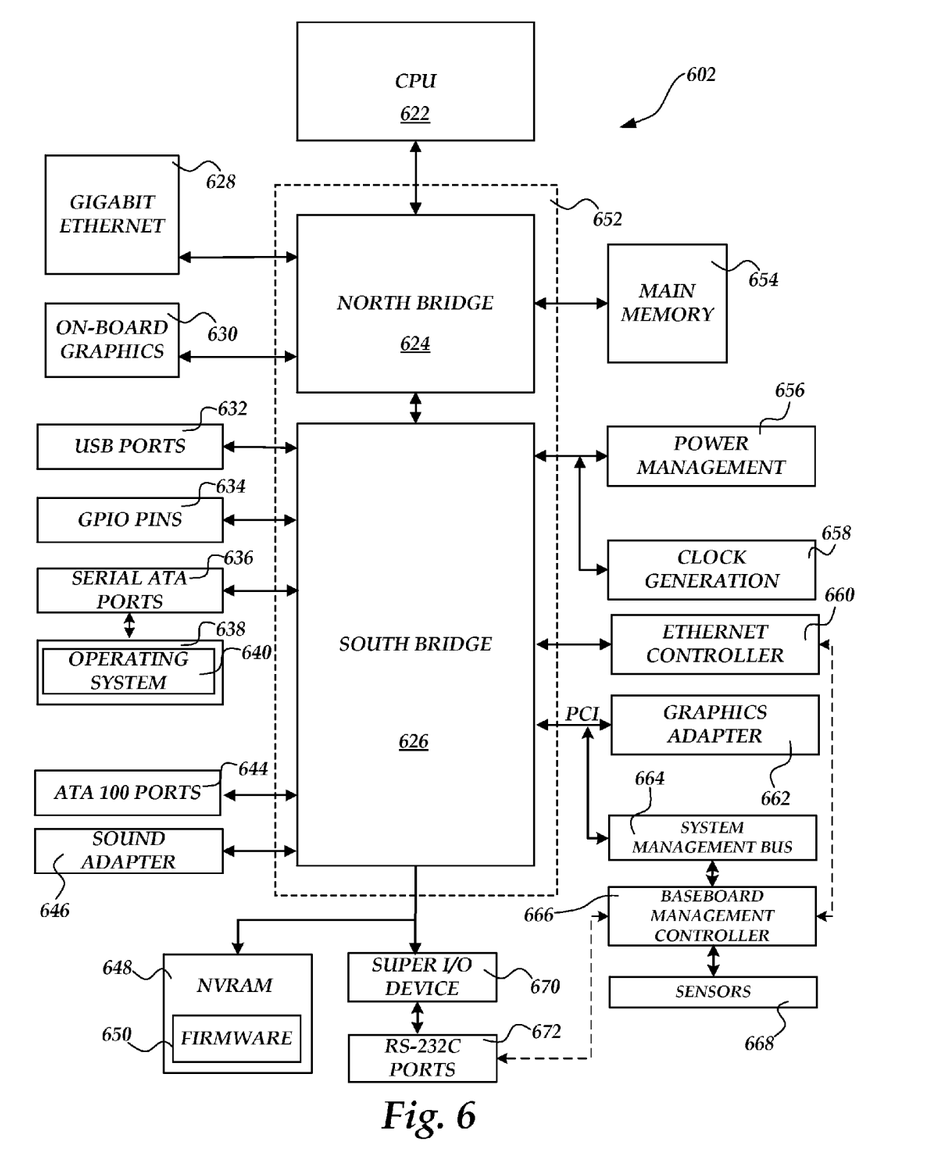
FIG. 6 is a computer architecture diagram showing an illustrative computer hardware architecture for a computing system capable of implementing aspects of the embodiments presented herein.

FIG. 6 and the following discussion are intended to provide a brief, general description of a suitable computing environment in which the embodiments described herein may be implemented. While the technical details are presented herein in the general context of program modules that execute in conjunction with the execution of an operating system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

FIG. 6 shows a computer architecture for an illustrative server computer 602 that may be utilized to execute the software components presented herein for performing a multi-protocol data transfer. The architecture shown in FIG. 6 may be utilized to implement a source computer 102 capable of executing the source TCP thread 108A and the source UDP thread 110A. The architecture shown in FIG. 6 may also be utilized to implement a destination computer 104 capable of executing the destination TCP thread 108B, the destination UDP thread 110B, and the writer thread 116. As discussed above, other types of computers and computing devices may also be utilized to implement the embodiments presented herein.

The server computer 602 includes a baseboard, or "motherboard", which is a printed circuit board to which a multitude of components or devices may be connected by way of a system bus or other electrical communication path. In one illustrative embodiment, a CPU 622 operates in conjunction with a chipset 652. The CPU 622 is a standard central processor that performs arithmetic and logical operations necessary for the operation of the computer. The server computer 602 may include a multitude of CPUs 622.

The chipset 652 includes a north bridge 624 and a south bridge 626. The north bridge 624 provides an interface between the CPU 622 and the remainder of the computer 602. The north bridge 624 also provides an interface to a random access memory ("RAM") used as the main memory 654 in the computer 602 and, possibly, to an on-board graphics adapter 630. The north bridge 624 may also include functionality for providing networking functionality through a gigabit Ethernet adapter 628. The gigabit Ethernet adapter 628 is capable of connecting the computer 602 to another computer via a network. Connections which may be made by the network adapter 628 may include LAN or WAN connections. LAN and WAN networking environments are commonplace in offices, enterprise-wide computer networks, intranets, and the internet. The north bridge 624 is connected to the south bridge 626.

The south bridge 626 is responsible for controlling many of the input/output functions of the computer 602. In particular, the south bridge 626 may provide one or more universal serial bus ("USB") ports 632, a sound adapter 646, an Ethernet controller 660, and one or more general-purpose input/output ("GPIO") pins 634. The south bridge 626 may also provide a bus for interfacing peripheral card devices such as a graphics adapter 662. In one embodiment, the bus comprises a peripheral component interconnect ("PCI") bus. The south bridge 626 may also provide a system management bus 664 for use in managing the various components of the computer 602. Additional details regarding the operation of the system management bus 664 and its connected components are provided below.

The south bridge 626 is also operative to provide one or more interfaces for connecting mass storage devices to the computer 602. For instance, according to an embodiment, the south bridge 626 includes a serial advanced technology attachment ("SATA") adapter for providing one or more SATA ports 636 and an ATA 100 adapter for providing one or more ATA 100 ports 644. The SATA ports 636 and the ATA 100 ports 644 may be, in turn, connected to one or more mass storage devices such as the SATA disk drive 638 storing an operating system 640 and application programs. As known to those skilled in the art, an operating system 640 comprises a set of programs that control operations of a computer and allocation of resources. An application program is software that runs on top of the operating system software, or other runtime environment, and uses computer resources to perform application specific tasks desired by the user. According to one embodiment of the invention, the operating system 640 comprises the LINUX operating system. According to another embodiment of the invention the operating system 640 comprises the WINDOWS SERVER operating system from MICROSOFT CORPORATION. According to another embodiment, the operating system 640 comprises the UNIX or SOLARIS operating system. It should be appreciated that other operating systems may also be utilized.

The mass storage devices connected to the south bridge 626, and their associated computer-readable media, provide non-volatile storage for the computer 602. Although the description of computer-readable media contained herein refers to a mass storage device, such as a hard disk or CD-ROM drive, it should be appreciated by those skilled in the art that computer-readable media can be any available media that can be accessed by the computer 602. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

A low pin count ("LPC") interface may also be provided by the south bridge 626 for connecting a "Super I/O" device 670. The Super I/O device 670 is responsible for providing a number of input/output ports, including a keyboard port, a mouse port, a serial interface 672, a parallel port, and other types of input/output ports. The LPC interface may also connect a computer storage media such as a ROM or a flash memory such as a NVRAM 648 for storing the firmware 650 that includes program code containing the basic routines that help to start up the computer 602 and to transfer information between elements within the computer 602.

As described briefly above, the south bridge 626 may include a system management bus 664. The system management bus 664 may include a BMC 666. In general, the BMC 666 is a microcontroller that monitors operation of the computer system 602. In a more specific embodiment, the BMC 666 monitors health-related aspects associated with the computer system 602, such as, but not limited to, the temperature of one or more components of the computer system 602, speed of rotational components (e.g., spindle motor, CPU Fan, etc.) within the system, the voltage across or applied to one or more components within the system 602, and the available or used capacity of memory devices within the system 602. To accomplish these monitoring functions, the BMC 666 is communicatively connected to one or more components by way of the management bus 664. In an embodiment, these components include sensor devices 668 for measuring various operating and performance-related parameters within the computer system 602. The sensor devices 668 may be either hardware or software based components configured or programmed to measure or detect one or more of the various operating and performance-related parameters.

It should be appreciated that the computer 602 may comprise other types of computing devices, including hand-held computers, embedded computer systems, personal digital assistants, and other types of computing devices known to those skilled in the art. It is also contemplated that the computer 602 may not include all of the components shown in FIG. 6, may include other components that are not explicitly shown in FIG. 6, or may utilize an architecture completely different than that shown in FIG. 6.

Based on the foregoing, it should be appreciated that technologies for multi-protocol data transfers are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for transmitting data using multiple data transmission protocols, the method comprising:
   transmitting control information for the data to a destination using a first protocol;
   transmitting a segment comprising a plurality of portions of the data to the destination using a second protocol;
   re-ordering portions of the segment received at the destination using the control information transmitted to the destination using the first protocol;
   determining, after re-ordering the portions of the segment received at the destination that one or more portions of the segment were not received at the destination;
   receiving control information from the destination identifying the one or more portions of the segment that were not received at the destination;
   adaptively selecting a resend protocol; and
   transmitting the one or more portions of the segment that were not received at the destination to the destination using the selected resend protocol.

2. The method of claim 1, wherein re-ordering the portions of the segment comprises re-ordering the portions of the segment into an order in which the portions of the segment were transmitted based on the control information.

3. The method of claim 1, wherein the selected resend protocol is the second protocol if an amount of data to transmit is greater than a threshold value and the selected resend protocol is the first protocol if the amount of data to transmit is less than the threshold value.

4. The method of claim 1, wherein the first protocol guarantees reliability and in-order delivery of data packets to the destination.

5. The method of claim 4, wherein the second protocol does not guarantee reliability or in-order delivery of data packets to the destination.

6. The method of claim 1, wherein the first protocol comprises the transmission control protocol (TCP).

7. The method of claim 6, wherein the second protocol comprises the user datagram protocol (UDP).

8. The method of claim 1, wherein the control information comprises a sequence table for a data file that comprises at least a portion of the data, wherein the sequence table identifies a sequence number for each of one or more a plurality of data packets in a segment of the data file to be transmitted from the source to the destination.

9. A non-transitory computer storage media having computer-executable instructions stored thereon which, when executed by a computer, cause the computer to:
   transmit control information for the data to a destination using a first protocol;
   transmit a segment of the data to a destination using a second protocol, the segment including a plurality of portions;
   re-order portions of the segment received at the destination using the control information transmitted to the destination using the first protocol;
   determine, after re-ordering the portions of the segment received at the destination that one or more portions of the segment were not received at the destination;
   receive control information from the destination identifying the one or more portions of the segment that were not received at the destination;
   adaptively select a resend protocol for transmitting the one or more portions of the segment that were not received at the destination to the destination; and
   transmit the one or more portions of the segment that were not received at the destination to the destination using the selected resend protocol.

10. The non-transitory computer storage media having computer-executable instructions stored thereon of claim 9, wherein re-ordering the portions of the segment comprises re-ordering the portions of the segment into an order in which the portions of the segment were transmitted based on the control information.

11. The non-transitory computer storage media having computer-executable instructions stored thereon of claim 9, wherein the selected resend protocol is the second protocol if an amount of data to transmit is greater than a threshold value and the selected resend protocol is the first protocol if the amount of data to transmit is less than the threshold value.

12. A method for receiving data from a source at a destination using multiple data transmission protocols, the method comprising:
   receiving control information for the data at the destination using a first protocol;
   receiving a plurality of portions of a segment of the data at the destination using a second protocol;
   re-ordering the portions of the segment using the control information transmitted to the destination using the first protocol;
   determining after re-ordering the portions of the segment received at the destination whether all of the transmitted portions of the segment of the data were received;
   transmitting control information to the source identifying one or more portions of the segment that were not received at the destination using the first protocol; and
   receiving the portions of the segment that previously were not received from the source.

13. The method of claim 12, wherein re-ordering the portions of the segment comprises re-ordering the portions of the segment into an order in which the portions of the segment were transmitted to the destination based on the control information.

14. The method of claim 12, wherein receiving the portions of the segment that previously were not received from the source comprises receiving the portions of the segment that previously were not received from the source using a selected resend protocol.

15. The method of claim 12, wherein the selected resend protocol is the second protocol if an amount of data to transmit is greater than a threshold value and the selected resend protocol is the first protocol if the amount of data to transmit is less than the threshold value.

16. The method of claim 12, wherein the first protocol guarantees reliability and in-order delivery of data packets to the destination.

17. The method of claim 16, wherein the second protocol does not guarantee reliability or in-order delivery of data packets to the destination.

18. The method of claim 12, wherein the first protocol comprises the transmission control protocol (TCP).

19. The method of claim 12, wherein the second protocol comprises the user datagram protocol (UDP).

20. The method of claim 12, wherein the control information comprises a sequence table for a data file that comprises at least a portion of the data, wherein the sequence table identifies a sequence number for each of one or more a plurality of data packets in a segment of the data file to be transmitted from the source to the destination.

* * * * *